United States Patent
Kohinata et al.

(10) Patent No.: US 6,788,928 B2
(45) Date of Patent: Sep. 7, 2004

(54) CELLULAR PHONE

(75) Inventors: Nobuaki Kohinata, Yokohama (JP);
Jun Maeoka, Kawasaki (JP); Shinichi Obata, Fujisawa (JP); Hiroshi Shimizu, Yokohama (JP); Masahiko Saito, Mito (JP); Atsushi Ogino, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/277,696

(22) Filed: Oct. 23, 2002

(65) Prior Publication Data

US 2003/0129964 A1 Jul. 10, 2003

(30) Foreign Application Priority Data

Jan. 9, 2002 (JP) ......................................... 2002-001901

(51) Int. Cl.[7] ................................................. H04M 1/66
(52) U.S. Cl. .................. 455/411; 455/414.1; 455/550.1; 382/116; 340/5.82
(58) Field of Search ................................ 455/410, 411, 455/414.1, 550.1; 382/124, 125, 126, 116, 115; 235/380, 376, 382, 382.5; 380/247, 229, 258; 340/501, 5.31, 5.52, 5.82, 5.8, 5.83

(56) References Cited

U.S. PATENT DOCUMENTS

| | | | | |
|---|---|---|---|---|
| 5,469,506 A | * | 11/1995 | Berson et al. | ............... 713/186 |
| 5,719,950 A | * | 2/1998 | Osten et al. | ................. 382/115 |
| 5,893,031 A | * | 4/1999 | Hoogerwerf et al. | ....... 455/410 |
| 5,991,408 A | * | 11/1999 | Pearson et al. | ............. 713/186 |
| 6,040,783 A | * | 3/2000 | Houvener et al. | ......... 340/5.53 |
| 6,104,922 A | * | 8/2000 | Baumann | ..................... 455/410 |
| 6,193,153 B1 | * | 2/2001 | Lambert | ...................... 235/380 |
| 6,298,230 B1 | * | 10/2001 | Schneider-Hufschmidt | . 455/411 |
| 6,330,457 B1 | * | 12/2001 | Yoon | ........................ 455/550.1 |
| 6,483,929 B1 | * | 11/2002 | Murakami et al. | .......... 382/115 |
| 6,572,014 B1 | * | 6/2003 | Lambert | ...................... 235/380 |

FOREIGN PATENT DOCUMENTS

| | | | | |
|---|---|---|---|---|
| CA | 2293118 A1 | * | 6/2001 | ............ G06K/9/00 |
| JP | 6-284182 | | 10/1994 | |
| JP | 2000-165378 | | 6/2000 | |

* cited by examiner

Primary Examiner—Charles Appiah
(74) Attorney, Agent, or Firm—Mattingly, Stanger & Malur, P.C.

(57) ABSTRACT

A cellular phone which is easy to use featuring a sufficient degree of safety preventing unauthorized use by conducting a minimum degree of required authentication operation which is not perceived by the user. As the user holds the cellular phone 1 by hand, the control unit 12 issues an instruction to temperature obtaining units 15 to start detecting the temperature. The temperature obtaining units measure the temperature at regular intervals, and successively transfer the obtained temperature data to a temperature comparator unit 16. The temperature comparator unit judges whether the temperature data obtained by the temperature obtaining units are lying within a predetermined condition, and issues an instruction to biodata obtaining units 19 to obtain fingerprint data of the user depending upon the result of judgement. The biodata obtaining units obtain the fingerprint data of the user and transfer the obtained fingerprint data to a biodata authentication unit 20. The biodata authentication unit compares the obtained fingerprint data with the fingerprint data of the owner stored in a biodata storage unit 21, and judges whether the user is the proper user.

6 Claims, 7 Drawing Sheets

CELLULAR PHONE

BACKGROUND OF THE INVENTION

This invention relates to technology for maintaining security of cellular phones.

Accompanying their ever advanced functions, the cellular phones are finding diversifying applications, such as a data (packet) communication terminal for carrying out electronic mails, chatting and internet browsing, that have evolved from module of speech, a database for the management of classified telephone directory and personal schedule data, as well as a game device and a simple digital camera. It is further becoming possible to obtain and watch the images and musical contents. In purchasing these contents, settlement can be done by using the cellular phone.

As described above, the cellular phone is capable of managing a variety of personal data related to the owner of the phone and conducting the settlement, and thus offers functions equivalent to the cash and credit cards. It, therefore, becomes necessary that the cellular phone is equipped with a mechanism which prevents the use by a third person without authentication, that would happen in case the cellular phone is tampered with, lost or is stolen.

On the side of the owner of the contents who delivers images and music to the cellular phones, on the other hand, a mechanism is necessary which guarantees that the cellular phone has been used by a normal registered user to prevent such an occurrence that the service is received by the unauthorized person.

There have been proposed many cellular phones equipped with a mechanism for preventing the unauthorized use. The method employed by these phones is to authenticate that the user of the cellular phone is a true owner by utilizing any one of biodata (such as fingerprint, voiceprint, retina) inherent in the owner who has been registered to the cellular phone in advance, or by utilizing a combination thereof. Concretely speaking, according to the cellular phone disclosed in Japanese Patent Laid-Open No. 284182/1994, the security control unit registers and collates the fingerprint by controlling a fingerprint reader unit, a fingerprint registering unit, a fingerprint collation/comparator unit and a fingerprint temporary storage unit being triggered by the operation of the security button and the power source switch and, further changes the security state. For example, when the user explicitly depresses the security button in a secure state where the power source circuit is closed and the telephone function is active enabling speech to be conducted, the fingerprint of the user is obtained and is compared with the fingerprint data that have been registered in advance to verify it. When it is authenticated that the user is the owner, it is allowed to use the normal telephone function. In other cases, the button operation is locked to prevent the use without authorization.

The cellular phone disclosed in Japanese Patent Laid-Open No., 165378/2000 is equipped with both a fingerprint authentication unit and a voiceprint authentication unit, the fingerprint authentication unit being provided in the power source switching unit. Therefore, the power source circuit is not closed unless the fingerprint is authenticated. The voiceprint authentication is also conducted, and the speech is not permitted unless the two forms of authentication are in agreement. Even when the speech is started, further, the power source circuit is opened when a predetermined period of time has passed to prevent the use without authorization.

Here, when the data of fingerprint only is used for authenticating the user of the cellular phone, it is not possible to distinguish whether the fingerprint of the owner of the cellular phone is that of his finger or the one copied onto an artificial material such as of silicon. Therefore, there remains a probability in that a person with evil intention other than the owner may succeed in getting the authentication. Hence, the safety is not sufficient.

According to the prior art, further, the user of the cellular phone must explicitly execute the authentication operation by depressing the security button for each use. When the security button is not depressed, the owner is judged to be an unauthenticated user and, as a result, limitation is often imposed on the functions that can be used. Namely, authentication requires cumbersome operation and makes it less easy to use the cellular phone.

Further, even when it is authenticated that the user is the owner of the cellular phone, the power source circuit is broken after the passage of a predetermined period of time for maintaining safety. Therefore, it is not allowed to sustain the waiting state for receiving a call at any time greatly spoiling one of the convenient features of the cellular phone. Further, the authentication operation is carried out at regular intervals irrespective of that the owner is now using the cellular phone. Namely, the authentication operation is conducted unnecessarily wastefully consuming the electric power. This shortens the operation time of the cellular phone that is powered by a battery. Thus, the authentication function, too, makes it less easy to use the cellular phone.

SUMMARY OF THE INVENTION

This invention therefore provides a cellular phone equipped with a security function which automatically and reliably authenticates the user and limits, the function of transmission when the user is not the owner, and offers a sufficient degree of safety relying upon a minimum degree of authentication operation.

The cellular phone provided by the invention comprises:
- an antenna for transmitting and receiving electromagnetic waves;
- a speaker for producing a voice of a distant person and for letting the user know a call;
- a microphone for picking up a voice;
- operation keys for inputting telephone numbers and for turning the power source circuit on and off;
- a display unit for displaying a telephone number and the content of an electronic mail;
- a memory for storing a-classified telephone directory and a software program;
- a display control unit for controlling the display unit;
- an operation control unit for controlling the function of the cellular phone depending upon an instruction from the operation keys and upon the authentication condition and for executing the application programs;
- communication module for transmitting and receiving speech and data (packet);
- use detection module for judging the state of contact to the user by measuring the temperature; and
- personal authentication module for authenticating that the user of the cellular phone is the owner.

DESCRIPTION OF THE PREFERRED EMBODIMENTS

Figure 1:
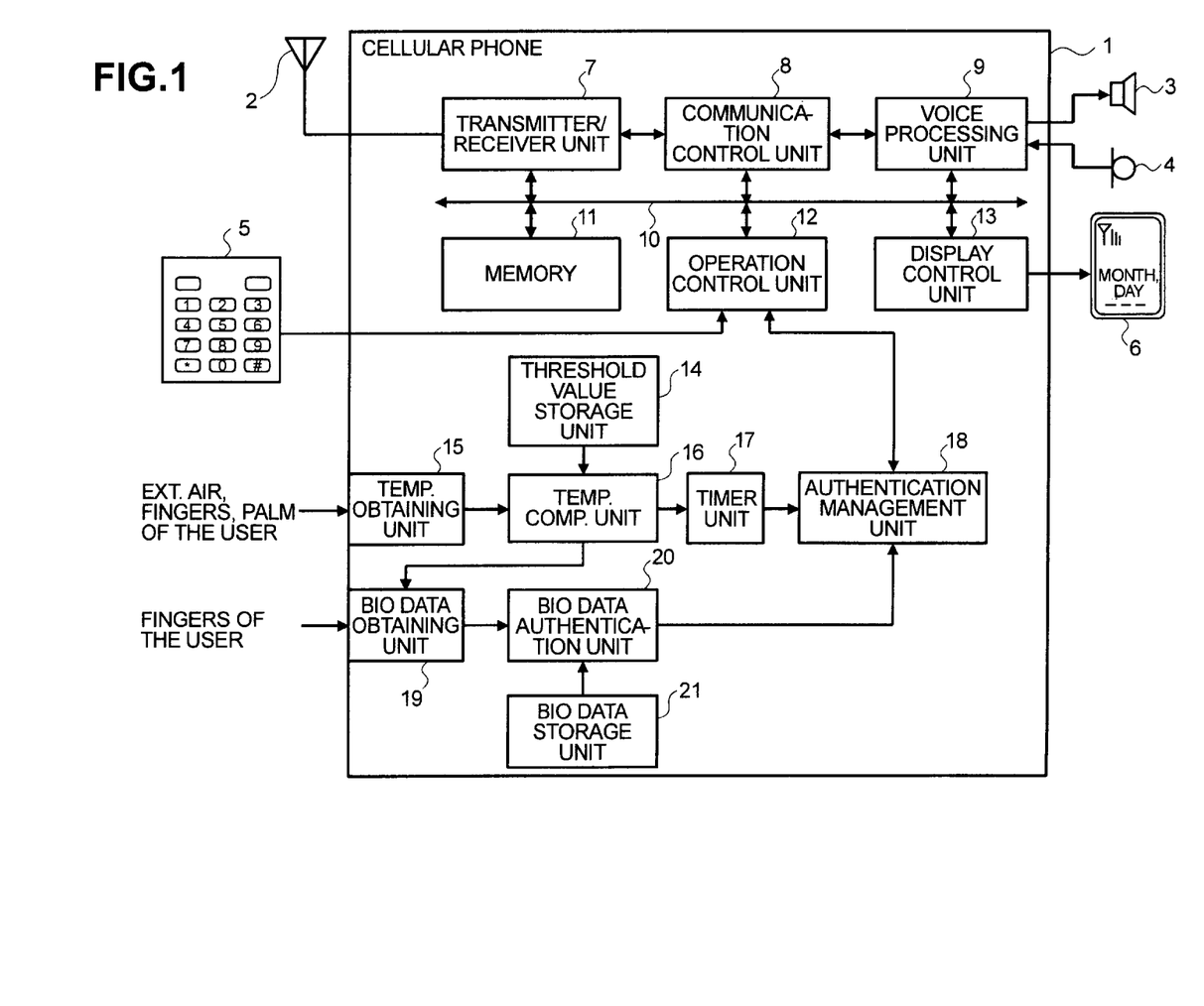
FIG. 1 is a diagram illustrating the constitution of a cellular phone according to a first embodiment of the invention.

The invention will now be described by way of embodiments. FIG. 1 illustrates the constitution of a cellular phone 1 according to a first embodiment of the invention.

As shown, the cellular phone 1 includes an antenna 2 for transmitting and receiving electromagnetic waves, a speaker 3 for producing a voice of a distant person and for letting the user know a call, a microphone 4 for picking up the voice of the user, a display unit 6 constituted by a liquid crystal display for displaying a telephone number, the content of an electronic mail, a menu screen for selecting various functions offered by an application program, the present time, the condition of electromagnetic waves and the authenticated state of the cellular phone 1, operation keys 5 for offering a direct interface to the user and comprising ten key buttons and function selection/determination buttons for inputting telephone numbers, characters, for selecting and determining the application program, for determining transmission or reception, and for turning the power source circuit on and off, a transmitter/receiver unit 7 which is a communication module for transmitting and receiving speech and data (packet), a communication control unit 8, a voice processing unit 9, a temperature obtaining unit 15 which is a use detection module for detecting the state of contact to the user, a threshold valve storage unit 14, a temperature comparator unit 16, a timer unit 17, a biodata obtaining unit 19 which is a personal authentication module for authenticating that the user is the owner of the cellular phone 1, a biodata authentication unit 20, a biodata storage unit 21, an authentication management unit 18, a memory 11 comprising a ROM or a RAM for storing electronic mails, browsers, software programs related to various applications such as personal schedule management, classified telephone directory, personal schedule data, transmitted and received mails, and data such as of automatic answering machine, a display control unit 13 for displaying various data such as dynamic image, still image, text and the like on the display unit 6, and an operation control unit 12 comprising chiefly a CPU for controlling the communication module and for executing the application programs depending upon a direct instruction from the user through the operation keys 5 and depending upon an instruction from the authentication management unit 18 constituting the authentication module. The transmitter/receiver unit 7, communication control unit 8, voice processing unit 9, memory 11, operation control unit 12 and display control unit 13 are coupled together through a bus 10, so that the necessary data can be exchanged among them.

Though not illustrated in FIG. 1, the operation control unit 12 is so constituted as to control the temperature obtaining unit 15 which constitutes the use detector module, the threshold value storage unit 14, the temperature comparator unit 16, the timer unit 17, the biodata obtaining unit 19 which constitutes the personal authentication module, the biodata authentication unit 20, the biodata storage unit 21, and the authentication management unit 19.

First, described below are the functional units constituting the communication module. The transmitter/receiver unit 7 is constituted by a low-noise amplifier, a power amplifier or a frequency synthesizer, and produces clock signals that are necessary for removing noise from the signals received by the antenna 2, for adjusting the level of the signals and for the IF (intermediate frequency) processing. The communication control unit 8 is constituted by a modulator, a demodulator or a communication protocol processor, and executes the communication protocol processing for modulating the signals to the transmitter/receiver unit 7, for demodulating the signals from the transmitter/receiver unit 7, and for transmitting and receiving the voice and packet data. The voice processing unit 9 is constituted by a voice code or an AD/DA converter, and decodes the encoded voice data from the communication control unit 8, converts the digital data into analog signals and, then, sends them to the speaker 3. The voice data picked up by the microphone 4 are converted from the analog signals into digital data, are, then, encoded, and are input to the communication control unit 8.

Next, described below are the functional units constituting the use detection module.

The temperature obtaining unit 15 is constituted by a plurality of temperature sensors arranged on the surface of the cellular phone 1 for detecting the temperature at regular intervals, and plays the role of measuring the body temperature of the user when the temperature obtaining unit 15 is touched by the palm or fingers of hand of the user and measuring the ambient temperature of the cellular phone when it is not touched.

The threshold value storage unit 14 stores threshold body temperatures of the owner of the cellular phone, i.e., stores the lower limit value only or both the upper-limit value and the lower-limit value. When consideration is given to obtaining he body temperature from the palm or fingers of empty human hand, the lower-limit value and the upper-limit value of the threshold temperatures are set to be 34° C. and 38° C., respectively. The threshold temperatures can be freely set by the user of the cellular phone 1.

Here, however, the operation for setting the threshold temperature can be executed only during a period in which it is authenticated that the user of the cellular phone 1 is its owner. This prevents the cellular phone 1 from malfunctioning due to tampering.

The temperature comparator unit 16 is a module for judging whether the cellular phone 1 is touched by the user, compares the temperature data measured by the temperature obtaining unit 15 with the threshold temperatures stored in the threshold value storage unit 14 at regular intervals, so judges that the cellular phone 1 is touched by the user and is used or is going to be used when it is detected that the temperature data lies within a range of the threshold temperatures, and issues an instruction to the biodata obtaining unit 19 to obtain the fingerprint of the user.

The temperature comparator unit 16 controls the operation of the timer unit 17 according to the result of comparison of the temperature data measured by the temperature obtaining unit 15 with the threshold temperatures stored in the threshold value storage unit 14. If described in detail, when the temperature is lower than the lower-limit value of the threshold temperature or when the upper-limit value has been set, the temperature comparator unit 16 issues an instruction to the timer unit 17 to start the timer upon detecting that the upper-limit value is exceeded. When it is detected that the temperature data is lying within the range of the threshold temperatures, on the other hand, the temperature comparator unit 16 issues an instruction to the timer unit 17 to end the time counting.

The timer unit 17 is a module for judging that the cellular phone 1 has not been touched by the user, and works to start counting a predetermined period of time or end the counting according to the instruction issued by the temperature comparator unit 16. If described in detail, the timer unit 17 starts counting upon receiving the instruction for starting the timer from the temperature comparator unit 16. After the start but before the predetermined period of time elapses, the counting readily ends when the instruction for ending the timer is received from the temperature comparator unit 16, and the instruction for starting the timer issued from the temperature comparator unit 16 is waited for. The timer unit starts counting as the temperature comparator unit 16 receives the instruction for starting the timer. However, when the instruction for ending the timer is not received from the temperature comparator unit 16 before the predetermined period of time elapses, the timer unit 17 notifies the time-out to the authentication management unit 18 at a moment when the timer has ended. Here, the timer unit 17 starts counting again when it has received the instruction for starting the timer from the temperature comparison unit 16. When the instruction for ending the timer is received from the temperature comparator unit 16, the timer unit 17 so judges that this instruction is meaningless and neglects it. The predetermined period counted by the timer unit 17 can be freely set by the user of the cellular phone 1.

The counting period can be set only during a period in which it is authenticated that the user of the cellular phone 1 is its owner. This prevents the cellular phone 1 from malfunctioning due to tampering.

Next, described below are the functional units constituting the authentication module.

The biodata obtaining unit 19 is a dedicated device for imaging the fingerprint by using a small imaging device such as a CCD camera by detecting an electrostatic capacity that changes upon being touched by a finger of the user of the cellular phone 1, and obtains the fingerprint or the finger data such as feature quantity inherent in the fingerprint from a particular finger of the user of the cellular phone upon receiving an instruction for obtaining the fingerprint issued from the temperature comparator unit 16, and readily transfers the fingerprint data that is obtained to the biodata authentication unit 20.

The biodata storage unit 21 stores in advance the fingerprint data obtained from at least one or more fingers of the owner of the cellular phone. The fingerprint data can be registered to, and erased from, the biodata storage unit 21 at the time when the cellular phone 1 is purchased (when the initial data are to be set) or after it has been purchased without using any particular or additional device; i.e., the fingerprint data obtained from the biodata obtaining unit 19 can be registered or can be erased from the application program.

Here, however, the operation related to registering or erasing the fingerprint data can be done from a particular application program for effecting various initial settings at the time of purchase or, after the purchase, for only a period of time in which it is authenticated that the user of the cellular phone 1 is its owner. This prevents the cellular phone 1 from being tampered or from being used without authorization.

The biodata authentication unit 20 compares the fingerprint data obtained by the biodata obtaining unit 19 with the fingerprint data stored in the biodata storage unit 21, and notifies the result of comparison such as in agreement or not in agreement to the authentication management unit 18. When they are in agreement, it is so recognized that the user of the cellular phone 1 is its owner. When they are not in agreement, it is not so recognized that the user of the cellular phone 1 is its owner and, hence, limitation is imposed on the use of the functions with which the cellular phone 1 is provided.

The authentication management unit 18 is a state machine for managing the present authenticated state of the cellular phone 1, and controls the operation of the cellular phone such as speech and data (packet) communication depending upon the states, controls the display of the classified telephone directory, controls the access to various kinds of data stored in the memory 11, controls the setting of temperature to the threshold value storage unit 14, and controls the registration and erasure of fingerprint data to and from the biodata storage unit 21. The shifts among the states constituting the state machine is generated by various instructions from the timer unit 17, biodata authentication unit 20 and operation control unit 12.

Next, described below is the operation of from when the power source circuit of the cellular phone 1 is closed until when the authentication operation is completed. The user holds the cellular phone 1 by his hand, and closes the power source circuit by manipulating a power source button in the operation keys 5. Then, the operation control unit 12 issues an instruction to the temperature obtaining unit 15 to start detecting the temperature. Upon receipt of this instruction, the temperature obtaining unit 15 measures the temperature at regular intervals and successively transfers the obtained temperature data to the temperature comparator unit 16. The temperature comparator unit 16 compares the temperature data offered by the plurality of temperature obtaining units 15 with the threshold temperatures set in the threshold value storage unit 14.

Let it now be presumed that the cellular phone 1 is used in a state where it is left to stand under a temperature condition lower than the threshold temperature set to the threshold value storage unit 14. Namely, the cellular phone 1 is held by hand causing an increase in the temperature data from the temperature obtaining unit 15 which is touched by the finger or palm of hand of the user. When the temperature data from the temperature obtaining units 15 of not smaller than a predetermined number exceed the threshold temperature set to the threshold value storage unit 14, the temperature comparator unit 16 so judges that the use of the cellular phone 1 is started as it is touched by the user and issues an instruction to the biodata obtaining unit 19 to obtain the fingerprint data of the user. Upon receipt of the above instruction, the biodata obtaining unit 19 obtains the fingerprint data of the user, and readily transfers the obtained fingerprint data to the biodata authentication unit 20.

The biodata authentication unit 20 compares the fingerprint data of the user obtained by the biodata obtaining unit 19 with the fingerprint data of the owner stored in the biodata storage unit 21, and notifies "authentication has succeeded" to the authentication management unit 18 to indicate that the authentication is successful when the fingerprint data of the user is in agreement with the fingerprint data of the owner. When they are not in agreement, on the other hand, the biodata authentication unit 20 notifies "authentication has failed" to the authentication management unit 18 to indicate that the authentication was not successful. The authentication operation of the cellular phone 1 is completed as "authentication has succeeded" is notified to the authentication management unit 18. In the foregoing was described the operation related to the authentication operation.

Figure 2:
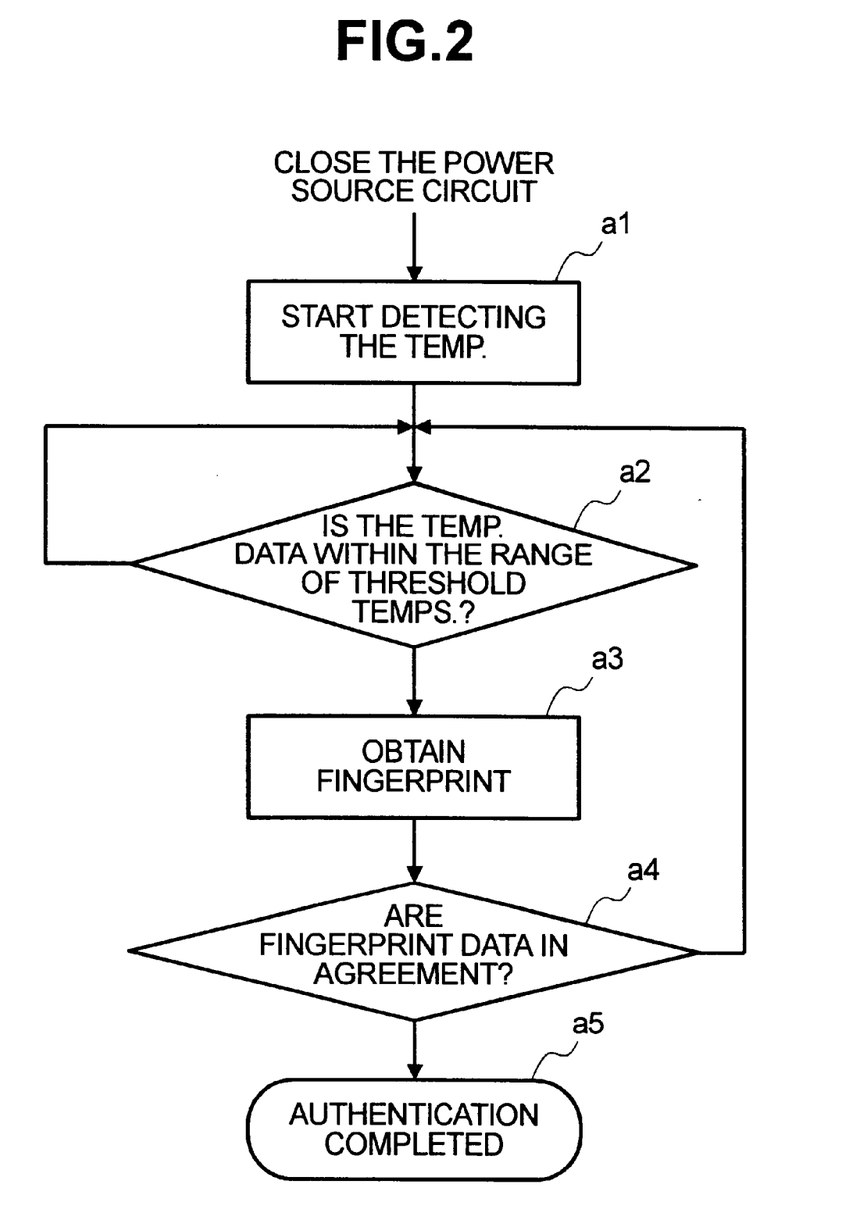
FIG. 2 is a flowchart illustrating the authentication operation of the cellular phone according to the first embodiment of the invention.

FIG. 2 is a flowchart illustrating the authentication operation described above. After the power source circuit is closed, the temperature obtaining unit starts detecting the temperature (step a1), and the threshold temperatures stored in the threshold value storage unit are compared with the temperature detected at step a1 to judge if the temperature data are lying within the range of the threshold temperatures (step a2). If the conditions of step a2 have been satisfied as a result of judgement, the biodata obtaining unit obtains the fingerprint (step a3). It is, then, judged if the fingerprint data obtained by the biodata authentication unit are in agreement with the fingerprint data stored in the biodata storage unit (step a4). The authentication is completed if the conditions of step a4 are satisfied as a result of judgement. When the conditions of step a4 have not been satisfied, the routine returns back to step a2 to repeat the authentication operation again.

When the authentication operation has succeeded, the authentication management unit 18 of the cellular phone 1 according to the first embodiment of the invention shown in FIG. 1 assumes the "authentication completed" state that will be described later. With the cellular phone 1 in the "authentication completed" state, this "authentication completed" state continues when the temperature data obtained through the temperature data obtaining units 15 of not smaller than a predetermined number is not lower than the lower-limit threshold temperature stored in the threshold storage unit 14, or is not lower than the lower-limit value but is not higher than the upper-limit value when there has been set the upper-limit value. During the period in which the "authentication completed" state is continuing, the authentication operation is not effected again. When the user who is using the cellular phone 1 changes his hand to hold it or when the cellular phone is temporarily placed on, for example, a desk letting the temperature data obtained from not smaller than a predetermined number of temperature obtaining units 15 to decrease to be lower than the lower-limit threshold temperature stored in the threshold storing unit 14, the temperature comparator unit 16 issues an instruction to the timer unit 17 to start the timer. Upon receipt of this instruction, the timer unit 17 starts the timer.

When the temperature data lies again within the above range of threshold temperatures before the timer unit 17 counts up the predetermined period of time, the "authentication completed" state continues. Therefore, the cellular phone 1 does not effect unnecessary authentication operation and, hence, suppresses the consumption of electric power which is caused by the authentication operation, minimizes the consumption of battery power and, hence, enables the cellular phone 1 to operate for an extended period of time.

On the other hand, when the temperature data do not lie within the range of threshold temperatures before the timer unit 17 counts the predetermined period of time, the timer unit 17 issues a "time-out" instruction to the authentication management unit 18. Upon receiving the "time-out", the authentication management unit 18 assumes the "authentication unfinished" state as will be described later. When the timer unit 17 counts time-out, the cellular phone 1 so judges that the user has discontinued the use and put it on a desk or put it in a pocket or a bag of the user and is no longer touching the cellular phone 1.

The cellular phone 1 executes the authentication operation again when it is to be used in the "authentication unfinished" state. The operation control unit 12 in the cellular phone 1 is monitoring the state of the authentication management unit 18 at all times, rejects all inputs through the operation keys 5 when the authentication management unit 18 is in the "authentication unfinished" state, and further so controls the display control unit 13 that the display unit 6 does not display any data except the present conditions of the electromagnetic waves, date and authenticated state. This prevents the third person from surreptitiously looking at the classified telephone directory, personal schedule data or the like data stored in the memory 11, and prevents the data from being intentionally erased.

From the side of the owner of the contents who offers such contents as images and music to the cellular phone 1, the contents cannot be down-loaded unless the cellular phone 1 is manipulated by the owner of the cellular phone. Therefore, the owner of the contents is allowed to avoid such a probability that an unauthenticated person attempts to receive the service and is, hence, allowed to reliably offer the contents to the normal users. In the "authentication unfinished" state, however, the cellular phone 1 is placed in the waiting state to receive a call.

Figure 3:
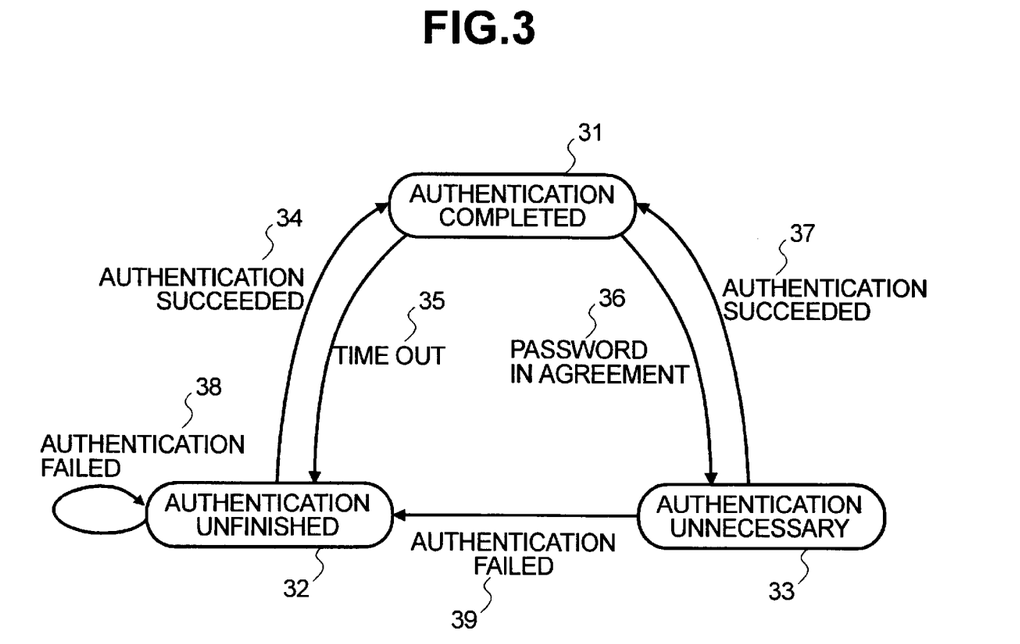
FIG. 3 is a diagram illustrating a state machine of the authentication management unit in the cellular phone according to the invention.

Next, described below with reference to FIG. 3 are the constitution and operation of the state machine with which the authentication management unit 18 of the cellular phone of FIG. 1 is provided. The cellular phone 1 is provided with two modes, i.e., an authentication mode in which limitation is imposed on the functions that can be used when the authentication operation has not been completed and a non-authentication mode in which the functions can be used without any limitation though the authentication operation has not been conducted. The state machine is constituted by a total of three states including "authentication completed" 31 indicating that the authentication has been completed without trouble in the authentication mode, "authentication unfinished" 32 indicating that the authentication has not been completed, and "authentication unnecessary" 33 indicating the non-authentication mode.

First, the cellular phone 1 is usually allowed to cut off the power source in any state. After the power source circuit is closed, the operation starts every time with the state of "authentication unfinished" 32 in the authentication mode. There are two kinds of state shift from the state of "authentication unfinished" 32. One is that though the authentication operation is attempted, the state of "authentication unfinished" 32 is assumed again when the "authentication has failed" 38 is informed. Another one is that as a result of attempting the authentication operation, the state is shifted to the state of "authentication completed" 31 when the "authentication has succeeded" 34 is informed from the biodata authentication unit.

Next, there are two kinds of state shift from the state of "authentication completed" 31. One is that the state shifts to the state of "authentication unnecessary" 33 in the non-authentication mode when the user has input a password by using the operation keys, when the password that is input is in agreement with the owner's password that has been registered in advance, and when the operation control unit has notified "passwords are in agreement" 36. Another one is that the state is shifted to the state of "authentication unfinished" 32 when the timer unit has informed "time-out" 35. Upon providing the state of "authentication unnecessary" 33, the owner is allowed to use the cellular phone 1 in a hands-free state without touching it. When the third person recognized by the owner uses the cellular phone, further, there is no need of registering the biodata of the third person to the cellular phone every time. Further, when it is considered that the cellular phone is used in a cold district by the user who wears gloves making it difficult to obtain the body temperature from the finger or palm of hand, the cellular phone can be easily used without the need of conducting the authentication.

Further, there are two kinds of state shifts from the state of the "authentication unnecessary" 33. The user starts the authentication operation by using the operation keys from the screen offered by an application for setting the authentication mode. Namely, the one is that the state shifts to the state of "authentication unfinished" 32 when the biodata authentication unit has notified the "authentication has failed" 39 though the authentication operation was attempted. Another one is that the state shifts to the state of "authentication completed" 31 when the biodata authentication unit has notified "authentication succeeded" 37 as a result of attempting the authentication operation.

Figure 4:
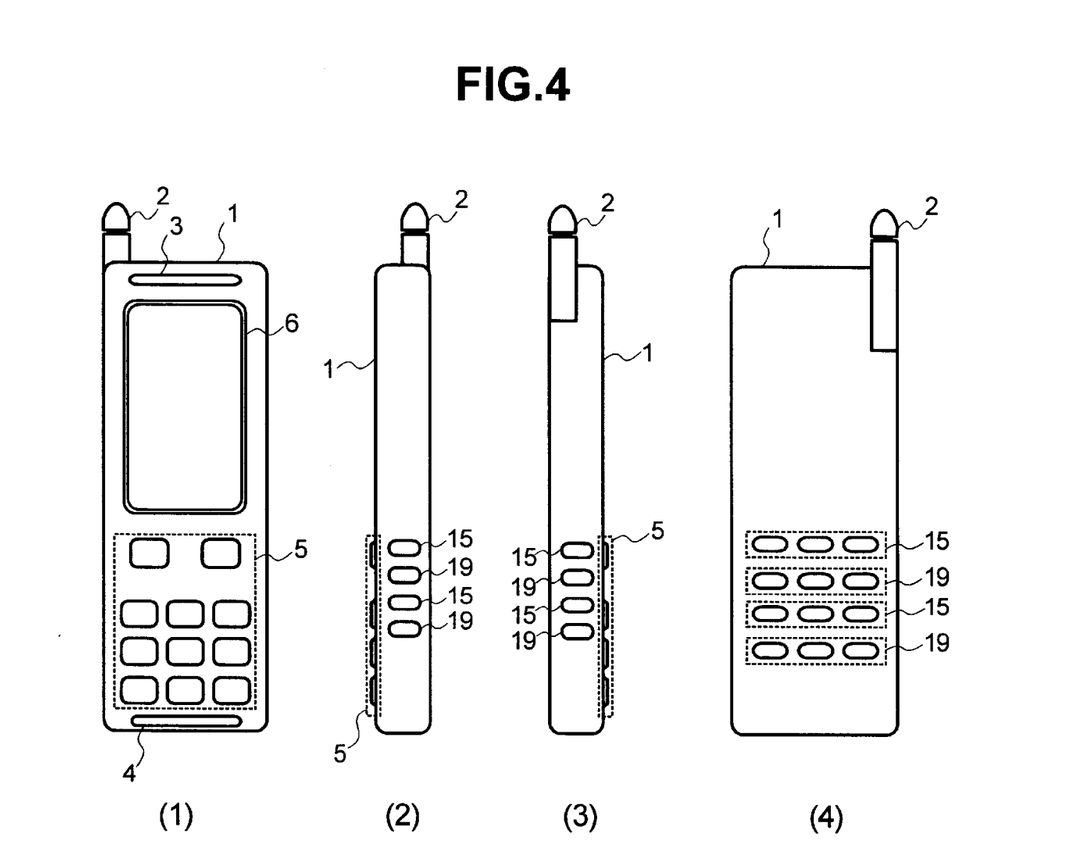
FIG. 4 is a view illustrating the arrangement of temperature obtaining units and biodata obtaining units of the cellular phone according to the first embodiment of the invention.

Further, described below with reference to FIGS. 4A–4D are the positions for disposing the temperature obtaining units 15 and the biodata obtaining units 19 with which the cellular phone 1 of the first embodiment of the invention of FIG. 1 is provided. FIG. 4A is a front view, FIG. 4B is a right side view, FIG. 4C is a left side view and FIG. 4D is a back view. As shown in FIG. 4A, the cellular phone 1 includes the speaker 3, microphone 4, operation key 5 and display unit 6 arranged on the front surface of the housing. The temperature obtaining units 15 are provided on the right side portion of the housing close to a portion of the operation keys 5 as shown in FIG. 4B, on the left side portion of the housing as shown in FIG. 4C, and on the back surface portion which is the back side of the operation keys 5 as shown in FIG. 4D.

The biodata obtaining units 19 of the cellular phone 1 are provided on the right side portion of the housing close to a portion of the operation keys 5 as shown in FIG. 4B, on the left side portion thereof as shown in FIG. 4C, and on the back surface portion which is the back side of the operation keys 5 as shown in FIG. 4D. It is further allowable to provide the temperature obtaining units 15 and the biodata obtaining units 19 at the same positions. The body temperature and the fingerprint of the user can be easily obtained since the temperature obtaining units 15 and the biodata obtaining units 19 are provided on the right side portion, on the left side portion and on the back surface portion of the housing close to the portion of the operation keys 5 which are most frequently touched by the user when he manipulates the cellular phone.

According to the cellular phone of the first embodiment of the invention shown in FIG. 1, the fingerprint data of the user are automatically obtained to authenticate the person under the condition where the temperature data from the temperature obtaining units are lying within a predetermined temperature range determined by the owner. Therefore, the user is allowed to use the cellular phone without giving attention to the authentication operation and without feeling bother. The authentication completed state continues when the predetermined temperature range is being detected irrespective of the state in which the cellular phone is used after the personal authentication has been completed without problem. In order to impart flexibility, further, the authentication completed state continues when the temperature range is detected within the predetermined period of time determined by the owner even when the body temperature has deviated out of the predetermined temperature range. While the authenticated state is being continued, the authentication operation is not conducted to suppress the consumption of electric power.

Even when the personal authentication has not been completed, provision of the "authentication unnecessary" mode makes it possible to use the cellular phone in such a manner as "hands-free" mode enabling the cellular phone to be easily used. When the personal authentication has failed, the function of the cellular phone is limited to receiving a call only, preventing the unauthorized use by the third person and enabling the contents distributor to reliably offer the contents to the normal users. Besides, since the temperature data are added to the conditions for obtaining the fingerprint data, it is made possible to prevent unauthorized authentication by using a fingerprint that is artificially reproduced.

Figure 5:
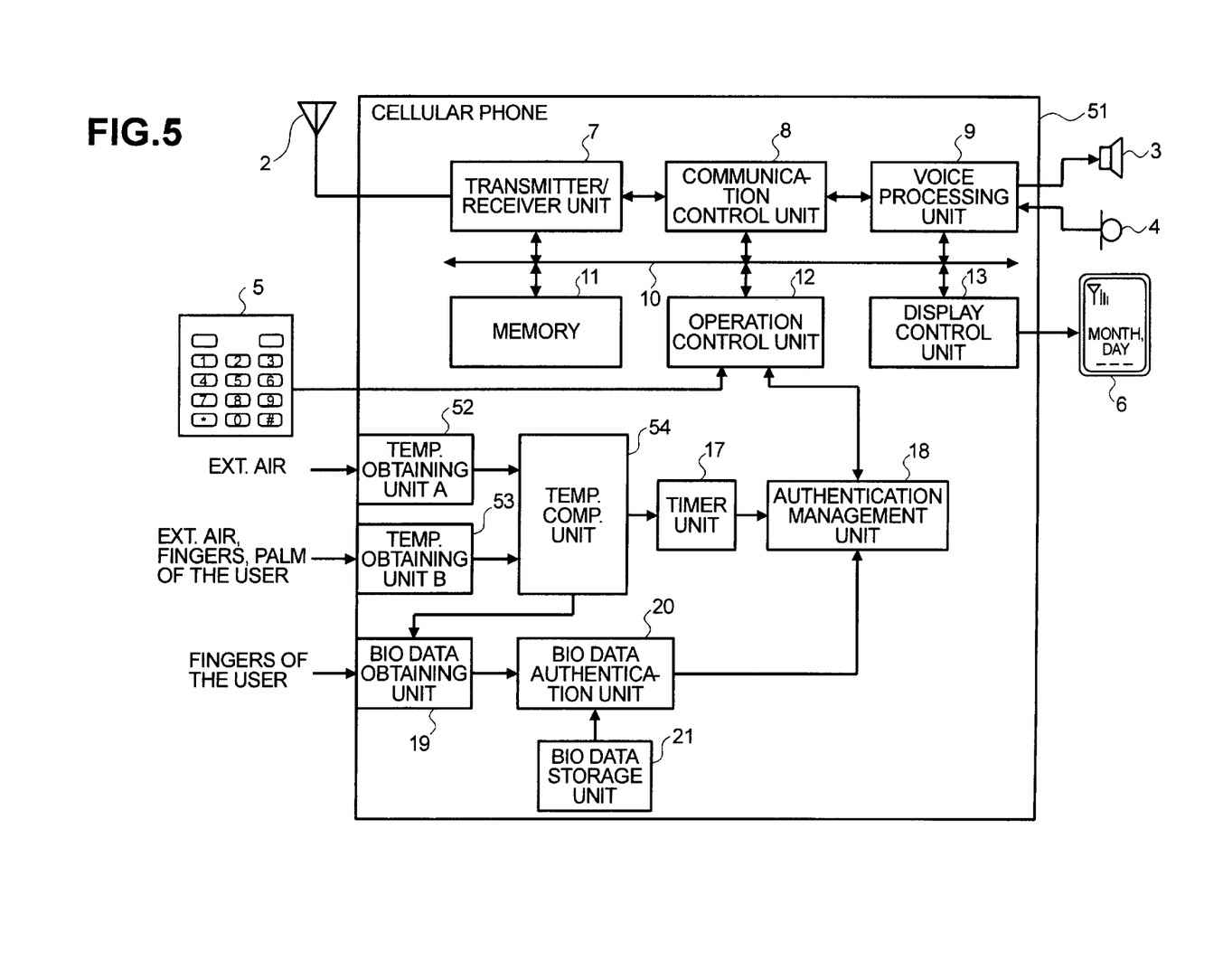
FIG. 5 is a diagram illustrating the constitution of the cellular phone according to a second embodiment of the invention.

FIG. 5 illustrates the constitution of the cellular phone 51 according to a second embodiment of the present invention. As shown, the cellular phone 51 includes the antenna 2 of the cellular phone 1 shown in FIG. 1, speaker 3, microphone 4, display unit 6, operation keys 5, transmitter/receiver unit 7 which is a communication module, communication control unit 8, voice processing unit 9, biodata obtaining unit 19 which is a personal authentication module, biodata authentication unit 20, biodata storage unit 21, authentication management unit 18, memory 11, display control unit 13 and operation control unit 12, and employs use detection module comprising temperature obtaining units A 52, temperature obtaining units B 53, temperature comparator unit 54 and timer unit 17 instead of the use detection module employed by the cellular phone 1. Further, the transmitter/receiver unit 7, communication control unit 8, voice processing unit 9, memory 11, operation control unit 12 and display control unit 13 are coupled together through a bus 10 so that the necessary data can be exchanged.

Though not clearly shown in FIG. 5, the operation control unit 12 is so constituted as to control the temperature obtaining units A 52, temperature obtaining units B 53, temperature comparator unit 54 and timer unit 17 that constitute the use detection module, as well as to control the biodata obtaining units 19, biodata authentication unit 20, biodata storage unit 21 and authentication management unit 18 that constitute the personal authentication module.

First, described are the functional units constituting the use detection module.

The temperature obtaining units A 52 are temperature sensors arranged in a plural number at positions which are least frequently touched by the user who manipulates the cellular phone 51 to detect the temperature at regular intervals, and play the role of measuring chiefly the ambient temperature of the cellular phone.

The temperature obtaining units B 53 are temperature sensors arranged in a plural number at positions which are most frequently touched by the user who manipulates the cellular phone 51 to detect the temperature at regular intervals, and play the role of measuring the body temperature of the user when touched by the palm of hand or finger of the user and play the role of measuring the ambient temperature of the cellular phone when they are not touched by the palm of hand or finger of the user.

The temperature comparator unit 54 is a module for judging whether the cellular phone 51 is touched by the user, and monitors, at regular intervals, a temperature differential (absolute value) between the temperature data A measured by the temperature obtaining units A 52 and the temperature data B measured by the temperature obtaining units B 53. When the temperature suddenly changes and becomes greater than a given specified value, the temperature comparator unit 54 so judges that the cellular phone 51 is touched by the user and is used, and issues an instruction to the biodata obtaining units 19 to obtain a fingerprint of the user.

The temperature comparator unit 54 controls the operation of the timer unit 17 according to the result of monitoring the temperature differential between the temperature data A and the temperature data B measured by the temperature obtaining units A 52 and the temperature obtaining units B 53. If described in detail, when it is detected that the temperature differential is smaller than a given specified value, the temperature comparator unit 54 issues an instruction to the timer unit 17 to start the timer. When it is detected that the temperature differential is greater than a given specified value, on the other hand, the temperature comparator unit 54 issues an instruction to the timer unit 17 to end the timer.

The timer unit 17 is the timer in the cellular phone 1 of FIG. 1 for judging that the cellular phone 51 has not been touched by the user, and works to start counting a predetermined period of time or end the counting according to the instruction issued by the temperature comparator unit 54.

Next, described below is the operation of from when the power source circuit of the cellular phone 51 is closed until when the authentication operation is completed. The user holds the cellular phone 51 by hand and manipulates a power source button in the operation keys 5 to close the power source circuit. Then, the operation control unit 12 issues an instruction to the temperature obtaining units A 52 and to the temperature obtaining units B 53 to start detecting the temperature. Next the temperature obtaining units A 52 and the temperature obtaining units B 53 that have received the above instruction work to measure the temperatures at regular intervals, and successively transfer the temperature data A obtained from the temperature obtaining unit A52 and the temperature data B obtained from the temperature obtaining unit B53 to the temperature comparator unit 54. The temperature comparator unit 54 monitors, at regular intervals, the temperature differential between the temperature data A and the temperature data B obtained from the temperature obtaining units A 52 and the temperature obtaining units B 53 which are provided in plural numbers.

For example, the user who is going to use the cellular phone 51 holds the cellular phone 51 by hand, whereby the temperature data B from the temperature obtaining units B 53 increase producing a difference from the temperature data A obtained from the temperature obtaining units A 52. When the temperature differential obtained from the temperature obtaining units A 52 and the temperature obtaining units B 53 of not smaller than a predetermined number exceed the specified value, the temperature comparator unit 54 so judges that the use of the cellular phone 51 is started as it is touched by the user and issues an instruction to the biodata obtaining units 19 to obtain the fingerprint data of the user. Upon receipt of the above instruction, the biodata obtaining units 19 obtain the fingerprint data of the user, and readily transfers the obtained fingerprint data to the biodata authentication unit 20. The biodata authentication unit 20 compares the fingerprint data of the user with the fingerprint data stored in the biodata storage unit 21, and notifies "authentication has succeeded" to the authentication management unit 18 to indicate that the authentication is successful when the fingerprint data that is obtained is in agreement with the fingerprint data of the owner stored in the biodata storage unit 21.

When they are not in agreement, on the other hand, the biodata authentication unit 20 notifies "authentication has failed" to the authentication management unit 18 to indicate that the authentication was not successful. The authentication operation of the cellular phone 51 is completed as "authentication has succeeded" is notified to the authentication management unit 18. In the foregoing was described the operation related to the authentication operation.

Figure 6:
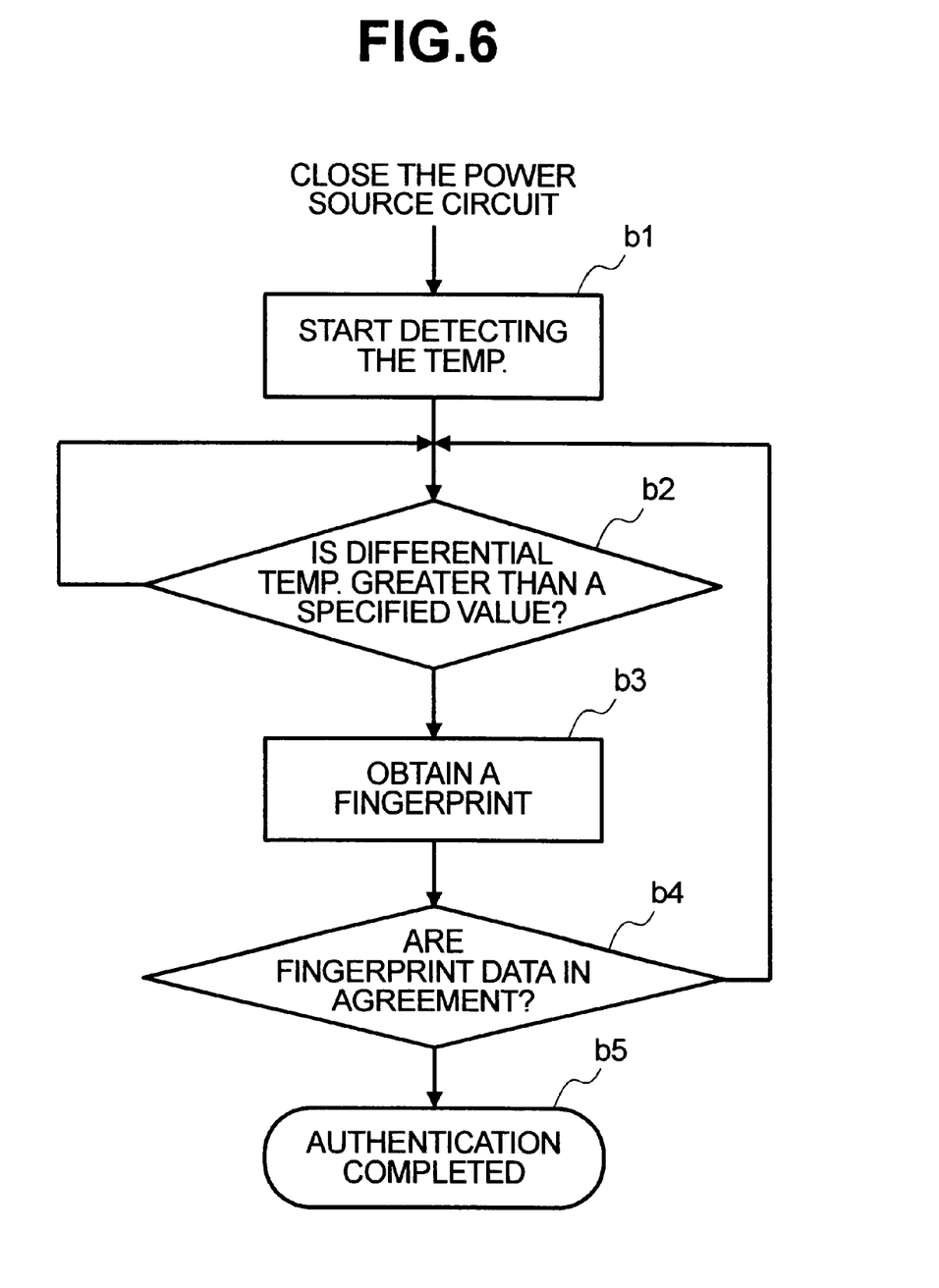
FIG. 6 is a flowchart illustrating the authentication operation of the cellular phone according to the second embodiment of the invention.

FIG. 6 is a flowchart illustrating the authentication operation described above. After the power source circuit is closed, the temperature obtaining units A and the temperature obtaining units B start detecting the temperature (step b1), and the temperature differential of the temperature data detected at step b1 is monitored to judge if the temperature differential is greater than a specified value (step b2). If the conditions of step b2 have been satisfied as a result of judgement, the biodata obtaining unit obtains the fingerprint (step b3). It is, then, judged if the fingerprint data obtained by the biodata authentication unit are in agreement with the fingerprint data stored in the biodata storage unit (step b4). The authentication is completed if the conditions of step b4 are satisfied as a result of judgement. When the conditions of step b4 have not been satisfied, the routine returns back to step b2 to repeat the authentication operation again.

When the authentication operation has succeeded, the authentication management unit 18 of the cellular phone 51 according to the second embodiment of the invention shown in FIG. 5 assumes the "authentication completed". With the cellular phone 51 in the "authentication completed" state, this "authentication completed" state continues when the temperature differential of the temperature data obtained from the temperature obtaining units A 52 and the temperature obtaining units B 53 of not smaller than a predetermined number is not smaller than the specified value. During the period in which the "authentication completed" state is continuing, the authentication operation is not effected again. When the user who is using the cellular phone 51 changes his hand to hold it or when the cellular phone 1 is temporarily placed on, for example, a desk letting the temperature data B obtained from not smaller than a predetermined number of temperature obtaining units B 53 to decrease causing the temperature differential from the temperature data A obtained from the temperature obtaining units A 52 to become smaller than the specified value, the temperature comparator 54 issues an instruction to the timer unit 17 to start the timer. Upon receipt of this instruction, the timer unit 17 starts the timer.

When the temperature differential becomes greater than the specified value before the timer unit 17 counts up the predetermined period of time, the "authentication completed" state continues. Therefore, the cellular phone 51 does not effect unnecessary authentication operation and, hence, suppresses the consumption of electric power caused by the authentication operation, minimizes the consumption of battery power and, hence, enables the cellular phone 51 to operate for an extended period of time. On the other hand, when the temperature differential becomes greater than the specified value before the timer unit 17 counts the predetermined period of time, the timer unit 17 issues a "time-out" instruction to the authentication management unit 18. Upon receiving the "time-out", the authentication management unit 18 assumes the "authentication unfinished" state.

When the timer unit 17 counts the time-out, the cellular phone 51 so judges that the user has discontinued the use and has put it on a desk or has put it in a pocket or a bag of the user and is no longer touching the cellular phone 51. The cellular phone 51 executes the authentication operation again when it is to be used in the "authentication unfinished" state.

Figure 7:
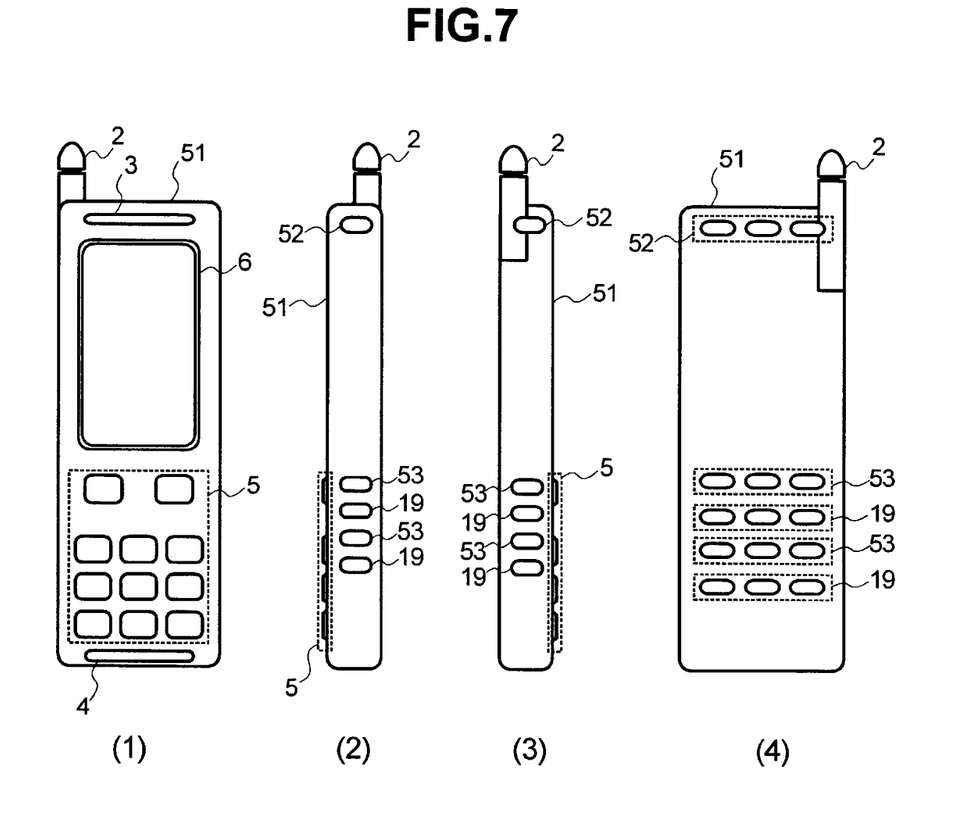
FIG. 7 is a view illustrating the arrangement of the temperature obtaining units and the biodata obtaining units of the cellular phone according to the second embodiment of the invention.

Further, described below with reference to FIGS. 7A–7D are the positions for disposing the temperature obtaining units A 52, the temperature obtaining units B 53 and the biodata obtaining units 19 with which the cellular phone 51 of the second embodiment of the invention of FIG. 5 is provided. FIG. 7A is a front view, FIG. 7B is a right side view, FIG. 7C is a left side view and FIG. 7D is a back view. As shown in FIG. 7A, the cellular phone 51 includes the speaker 3, microphone 4, operation keys 5 and display unit 6 arranged on the front surface of the housing. The temperature obtaining units A 52 are provided on the right side portion of the housing close to a portion of the speaker 3 as shown in FIG. 7B, on the left side portion of the housing as shown in FIG. 7C, and on the back surface portion which is the back side of the speaker 3 as shown in FIG. 7D. The temperature obtaining units B 53 are provided on the right side portion of the housing close to a portion of the operation keys 5 as shown in FIG. 7B, on the left side portion of the housing as shown in FIG. 7C, and on the back surface portion which is the back side of the operation keys 5 as shown in FIG. 7D.

The biodata obtaining units 19 of the cellular phone 51 are provided on the right side portion of the housing close to a portion of the operation keys 5 as shown in FIG. 7B, on the left side portion thereof as shown in FIG. 7C, and on the back surface portion which is the back side of the operation keys 5 as shown in FIG. 7D. It is further allowable to provide the temperature obtaining units 15 and the biodata obtaining units 19 at the same positions. The external air temperature can be measured irrespective of whether the cellular phone is being used or not being used since the temperature obtaining units A 52 are provided on the right side portion, on the left side portion and on the back surface portion of the housing close to the portion of the speaker 3 which is least frequently touched by the user when he manipulates the cellular phone 51. Further, the body temperature and the fingerprint of the user can be easily obtained since the temperature obtaining units B 53 and the biodata obtaining units 19 are provided on the right side portion, on the left side portion and on the back surface portion of the housing close to the portion of the operation keys 5 which are most frequently touched by the user when he manipulates the cellular phone.

According to the cellular phone of the second embodiment of the invention shown in FIG. 5, there are provided the temperature obtaining units chiefly for obtaining the body temperature of the user and the temperature obtaining units chiefly for obtaining the external air temperature, and the fingerprint data of the user are automatically obtained to authenticate the person under the condition where the temperature differential (absolute value) of the temperature data measured by the temperature obtaining units is not smaller than a predetermined temperature in order to remove the effect of the external air temperature from the temperature distribution obtained as the user touches the cellular phone. Therefore, it is allowed to improve the detection precision concerning the touch between the cellular phone and the user. Besides, the user is allowed to use the cellular phone without giving attention to the authentication operation and without feeling bother.

The authentication completed state continues when the predetermined temperature differential is being detected irrespective of the state in which the cellular phone is used after the personal authentication has been completed without problem. In order to impart flexibility, further, the authentication completed state continues when the temperature differential is detected within the predetermined period of time determined by the owner even when the predetermined temperature differential is not maintained. While the authenticated state is being continued, the authentication operation is not conducted to suppress the consumption of electric power. The authentication operation is conducted while the user is not quite aware of this. Besides, the present authenticated state in the cellular phone is managed, and the authentication operation is not conducted while the authenticated state is continuing so will not to undesirably consume the electric power. When the authentication has not been completed, limitation is imposed on the usable functions of the cellular phone to maintain safety even in case the cellular phone has been missing or stolen. Since the authentication can be completely reset, the cellular phone can be used in a hands-free manner or permits a third person to use it.

It needs not be pointed out that the invention is in no way limited to the above embodiments only but can be varied and put into practice without departing from the spirit and scope of the invention irrespective of the field to where the invention is applied. Not being limited to cellular phones, the invention can be applied to, for example, small equipment such as PDA and the like.

According to the invention, it is judged whether the temperature data obtained by the temperature obtaining units in the cellular phone are within a predetermined condition, and the personal authentication is effected relying upon the fingerprint data of the user depending upon the judged result. Therefore, the authentication operation is conducted automatically and reliably, but the authentication does not succeed even when a fingerprint copied on an artificial material is used, offering a sufficient degree of safety.

We claim:

1. A cellular phone comprising:

an antenna for transmitting and receiving electromagnetic waves;

a speaker for producing a voice of a distant person and for letting the user know a call;

a microphone for picking up a voice;

operation keys for inputting telephone numbers and for turning the power source circuit on and off;

a display unit for displaying a telephone number and the content of an electronic mail;

a memory for storing a classified telephone directory and a plurality of application programs;

a display control unit for controlling the display unit;

an operation control unit for executing the plurality of application programs and for controlling the functions of the cellular phone depending upon an instruction from the operation keys and upon an authenticated state;

a communication module for transmitting and receiving data (packet);

a use detection module for judging a state touched by the user by measuring a temperature of a surface of the cellular phone;

a personal authentication module for executing an authentication operation for authenticating that the user of the cellular phone is the owner;

wherein the personal authentication module is started to execute the authentication operation when it is detected, as a triggering condition, by the use detection module that the temperature is within a predetermined temperature range, wherein the use detection module includes temperature obtaining units for measuring the temperature, a threshold value storage unit for storing temperature data that specify a predetermined temperature range, a temperature comparator unit which is a module for comparing the temperature data measured by the temperature obtaining units with the temperature data stored in the threshold value storage unit and judges the state of touch between the cellular phone and the user, and a timer unit which is a module that starts the counting when the temperature data measured by the temperature obtaining units lie outside the predetermined temperature range, that ends the counting when it is determined that the temperature data are lying again within the temperature range, and issues a time-out instruction when the counting end instruction is not received within the passage of a predetermine period of time after the start of the counting to determine that the user is not touching the cellular phone; and the personal authentication module includes biodata obtaining units for obtaining the fingerprint data of the user according to an instruction of the temperature comparator unit in the use detection module, a biodata storage unit for storing the fingerprint data of the owner of the cellular phone, a biodata authentication unit which is a module that compares the fingerprint data obtained by the biodata obtaining units with the fingerprint data stored in the biodata storage unit and determines that the user is the owner, and an authentication management unit for holding the presently authenticated state of the cellular phone.

2. A cellular phone according to claim 1, wherein the authentication management unit in the personal authentication module includes an authentication mode which requires the authentication operation when the cellular phone is to be used and a non-authentication mode which does not require the authentication operation, and manages the authentication state of the cellular phone in three states of "authentication completed" state indicating that the user has been authenticated to be the owner, the "authentication unfinished" state indicating that the user has not been authenticated to be the owner, which are for the authentication mode, and the "authentication unnecessary" state which is for the non-authentication mode, thereby to change the usable functions depending upon the states.

3. A cellular phone according to claim 2, wherein the owner of the cellular phone is allowed to freely set the temperature data for specifying the temperature range stored in the threshold value storage unit of the use detection module, and a predetermined period of time counted by the timer unit of the use detection module.

4. A cellular phone according to claim 3, wherein the temperature obtaining units in the use detection module are provided in a plural number on the side surface portions of the cellular phone at where the operation keys are provided and on the back surface portion thereof.

5. A cellular phone comprising:

an antenna for transmitting and receiving electromagnetic waves;

a speaker for producing a voice of a distant person and for letting a user know a call;

a microphone for picking up a voice;

operation keys for inputting telephone numbers and for turning a power source circuit on and off;

a display unit for displaying a telephone number and contents of an electronic mail;

a memory for storing a classified telephone directory and a plurality of application program;

a display control unit for controlling the display unit;

an operation control unit for executing the plurality of application programs and for controlling functions of the cellular phone depending upon an instruction from the operation keys and upon a authenticated state and for executing the plurality of application programs;

a communication module for transmitting and receiving data (packet);

a use detection module for judging a state touched by the user by measuring a temperature of a surface of the cellular phone; and a personal authentication module for executing an authentication operation for authenticating that the user of the cellular phone is the owner;

wherein the personal authentication module is started to execute an authentication operation when it is detected, as a triggering condition, by the use detection module that a predetermined temperature differential is exceeded, and wherein the use detection module includes temperature obtaining units (A) for chiefly obtaining the body temperature of the user, temperature obtaining units (B) for chiefly obtaining the external air temperature, a temperature comparator unit for judging the state of touch between the cellular phone and the user by utilizing a temperature differential that is obtained by correcting the effect of the external air temperature by subtracting the temperature data measured by the temperature obtaining units (B) from the temperature data measured by the temperature obtaining units (A), and a timer unit which is a module that starts the counting when the temperature differential is smaller than a predetermined temperature differential, that ends the counting when it is detected that the temperature differential is greater again than the predetermined temperature differential, and issues a time-out instruction when the counting end instruction is not received within the passage of a predetermine period of time after the start of the counting to determine that the user is not touching the cellular phone.

6. A cellular phone according to comprising:

an antenna for transmitting and receiving electromagnetic waves;

a speaker for producing a voice of a distant person and for letting a user know a call;

a microphone for picking up a voice;

operation keys for inputting telephone numbers and for turning a power source circuit on and off;

a display unit for displaying a telephone number and contents of an electronic mail;

a memory for storing a classified telephone directory and a plurality of application program;

a display control unit for controlling the display unit;

an operation control unit for executing the plurality of application programs and for controlling functions of the cellular phone depending upon an instruction from the operation keys and upon a authenticated state and for executing the plurality of application programs;

a communication module for transmitting and receiving data (packet);

a use detection module for judging a state touched by the user by measuring a temperature of a surface of the cellular phone; and a personal authentication module for executing an authentication operation for authenticating that the user of the cellular phone is the owner;

wherein the personal authentication module is started to execute an authentication operation when it is detected, as a triggering condition, by the use detection module that a predetermined temperature differential is exceeded, and wherein the temperature obtaining units (A) in the use detection module are provided in a plural number on the side surface portions at the upper part of the cellular phone and on the back surface portion thereof, and the temperature obtaining portions (B) are provided in a plural number on the side surface portions at the lower part of the cellular phone at where the operation keys are provided and on the back surface portion thereof.

* * * * *